US006985545B2

(12) United States Patent
Teo et al.

(10) Patent No.: US 6,985,545 B2
(45) Date of Patent: Jan. 10, 2006

(54) APPARATUS AND METHOD TO PROVIDE SPECTRUM SHARING FOR TWO OR MORE RF SIGNALS OCCUPYING AN OVERLAPPING RF BANDWIDTH

(75) Inventors: Koon H. Teo, Nepean (CA); Shiquan Wu, Nepean (CA); David G. Steer, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 772 days.

(21) Appl. No.: 09/746,929

(22) Filed: Dec. 26, 2000

(65) Prior Publication Data

US 2002/0118784 A1 Aug. 29, 2002

(51) Int. Cl.
*H04B 1/10* (2006.01)
(52) U.S. Cl. .................. 375/349; 375/144; 375/147; 375/346; 455/132
(58) Field of Classification Search .............. 455/132, 455/422.1; 375/144, 147, 316, 346, 146, 375/349, 319, 148, 134, 341, 136, 130, 149, 375/140, 265, 343, 315, 143; 370/320, 342, 370/335, 347; 341/94
See application file for complete search history.

(56) References Cited

U.S. PATENT DOCUMENTS

| | | | | |
|---|---|---|---|---|
| 5,251,232 A | | 10/1993 | Nonami | 375/5 |
| 5,469,115 A | | 11/1995 | Peterzell et al. | 330/129 |
| 5,490,172 A | | 2/1996 | Komara | 375/296 |
| 5,537,435 A | | 7/1996 | Carney et al. | 375/219 |
| 5,592,480 A | * | 1/1997 | Carney et al. | 370/347 |
| 5,608,722 A | * | 3/1997 | Miller | 370/320 |
| 5,796,772 A | | 8/1998 | Smith et al. | 375/200 |
| 5,838,267 A | * | 11/1998 | Wang et al. | 341/94 |
| 5,852,630 A | * | 12/1998 | Langberg et al. | 375/219 |
| 5,936,950 A | * | 8/1999 | Hottinen | 370/342 |
| 5,999,573 A | | 12/1999 | Zangi | 375/316 |
| 6,282,184 B1 | * | 8/2001 | Lehman et al. | 370/342 |
| 6,512,478 B1 | * | 1/2003 | Chien | 342/357.09 |
| 6,587,448 B1 | * | 7/2003 | Dajer et al. | 370/335 |
| 6,618,433 B1 | * | 9/2003 | Yellin | 375/148 |
| 2002/0054623 A1 | * | 5/2002 | Wang et al. | 375/148 |

OTHER PUBLICATIONS

"An efficient IF architecture for dual-mode GSM/W-CDMA receiver of a software radio" Ming Jian; Weng Ho Yung; Bai Songrong; Mobile Multimedia Communications, 1999. (MoMuC '99) 1999 IEEE International Workshop on, Nov. 15-17, 1999 pp.:21-24.*
U.S. Appl. No. 08/996,133, filed Dec. 22, 1997, Lehman et al.

* cited by examiner

*Primary Examiner*—Shuwang Liu
*Assistant Examiner*—T Wang

(57) ABSTRACT

An RF radio receiver utilizing wideband RF technology, a wideband digital IF (channelizer) tuner, a common digitizing rate, and multi-user detection (MUD) processes a superposed RF signal to allow simultaneous reception of two or more RF signals sharing overlapping frequency spectrum (RF bandwidth). The RF radio receiver is particularly effective for two or more RF signals of differing RF channel bandwidth and can also receive signals which accord to different air interface standards. The use of a common digitizing rate provides for oversampling of at least one of the RF signals for more accurate decoding and allows for a synchronized signal (i.e. at a common rate) to be used in decoding, and in particular multi-user decoding of other RF signals.

11 Claims, 6 Drawing Sheets

APPARATUS AND METHOD TO PROVIDE SPECTRUM SHARING FOR TWO OR MORE RF SIGNALS OCCUPYING AN OVERLAPPING RF BANDWIDTH

FIELD OF THE INVENTION

The present invention relates to a method and apparatus for spectrum sharing in wireless network radio systems and, more particularly, to an apparatus and method of processing a superposed RF (radio frequency) signal containing two or more RF signals occupying overlapping RF bandwidth.

BACKGROUND OF THE INVENTION

With the increasing demand for wireless services, contention for limited radio spectrum is becoming an important issue. In particular, it is anticipated that there will be an increasing demand for data services. An example of the larger bandwidth needed for data is the UMTS radio system UTRAN (a trade name for CDMA air interface standards aimed at 3G (third generation) requirements) having a channel Bandwidth=5 MHz while other current and future systems such as IS-95 or 1XRTT (channel Bandwidth=1.25 MHz) have been optimized for voice services. Because of expanding needs for both voice and data services, there has been some interest in developing an RF receiver than can handle signals having different air interfaces and different RF channel bandwidths.

It is well known that it is difficult to mix voice and data services and provide a common radio system or modem that handles both. Ideally, a system should be able to provide both voice and data services efficiently and simultaneously. In conventional systems, the performance of one is often optimized at the expense of the other because the voice service generally requires a circuit mode of operation while the data service requires a packet mode of operation.

One current solution is to provide both voice and data using the same modem. This is often done at the expense of system capacity and performance. These systems use two different radio systems with one optimized for voice, occupying a particular section of the frequency spectrum, and the other optimized for data, occupying another (generally adjacent) part of the spectrum. This solution has certain difficulties including that 1) a large amount of spectrum is required and 2) it is necessary to switch between voice and data services. Further, the switching can be slow because of the need for hard hand over, that is, during hand over, the RF front end is required to switch frequency, causing some delay.

These current solutions do not offer simultaneous use of voice and data services and thus may result in wasted spectrum if the mix of voice and data traffic changes (e.g. when there is only data traffic, the voice spectrum is not used).

Further, when planning the design of new radio systems it is also important to consider the transition between a previous generation and newer systems and services. As traffic from users shifts from voice to data, for example, system operators may wish to use their radio spectrum to provide a different combination of services. In this case, it would be advantageous for the channels for these services to overlap as the cost of new spectrum and equipment may be expensive. The development of a suitable radio system that allows two or more radio systems to share overlapping spectrum and that adapts to changes in the traffic (i.e. from voice to data) is thus an important element in the development of future generation radio systems.

SUMMARY OF THE INVENTION

The invention provides a system in which two or more wireless services of similar or different RF channel bandwidth can share the same spectrum. This provides benefits such as: more efficient utilization of the spectrum, improved switching times (seamless handover) between the two or more wireless services (e.g. between voice and data services), and simultaneous voice and data services through a single radio receiver.

More particularly, utilizing wideband RF technology, a wideband digital IF (channelizer) tuner, a common digitizing rate, and multi-user detection (MUD) processes allows simultaneous reception of two or more RF signals sharing overlapping frequency spectrum (RF bandwidth). The RF radio receiver is particularly effective for two or more RF signals of differing RF channel bandwidth and can also receive signals which accord to different air interface standards. The use of a common digitizing rate provides for oversampling of at least one of the RF signals for more accurate decoding and allows for a synchronized signal (i.e. at a common rate) to be used in decoding, and in particular multi-user decoding of other RF signals. The invention allows the same RF front end to be used for all signals providing a cost savings and allows hand over between, or simultaneous use of, data and voice to be achieved easily without having to switch between spectrum bands. Also, a system utilizing an embodiment of the invention would allow an operator to transition to new services without the need to purchase new equipment for their radio base stations and users to make use of new services without the need to purchase new handsets. For example, an operator may be providing voice services using a 1XRTT radio interface and may plan to transition to a UTRAN radio interface for future data (and voice) services. Overlapping the 1XRTT and the UTRAN radio channels provides a convenient method for evolution of the services.

In accordance with an aspect of the present invention there is provided a wireless communication receiver for processing a superposed RF (radio frequency) signal containing two or more RF signals occupying overlapping RF bandwidth, in which the wireless communication receiver includes a wideband receiver for receiving the superposed RF signal, an analog to digital converter for converting the received superposed RF signal to a superposed digital signal using a common digitizing rate, a channelizer for each of the RF signals that receives the superposed digital signal and limits the superposed digital signal to a bandwidth that corresponds with the bandwidth of each of the RF signals, providing a bandwidth clipped digital signal for each of the RF signals, and a signal handling device for each of the RF signals that receives one bandwidth clipped digital signal. In particular, the signal handling device includes a multi-user detection decoder that shares data with multi-user detection decoders in other signal handling devices to decode the bandwidth clipped digital signal to remove conventional and multi-access interference and provide a decoded digital signal, and a rate adjuster that adjusts a sampling rate of the decoded digital signal to provide an output signal having a predetermined sampling rate.

In a particular case, each channelizer may include a rate adjuster that adjusts a sampling rate of the superposed digital signal to an adjusted common digitizing rate, wherein the adjusted common digitizing rate is a reduced multiple of each predetermined sampling rate. In this way, the processing to be carried out at the signal handling devices may be reduced.

In another particular case, at least one signal handling device may include a stream separator for forming separate streams from the bandwidth clipped digital signal, each stream based on a set of samples from the bandwidth clipped digital signal at the predetermined sampling rate and wherein the multi-user detection decoder decodes the bandwidth clipped digital signal responsive to the streams. In this case, all signal handling devices but the signal handling device for the RF signal having the largest bandwidth may be provided with the stream separator.

In another particular case, the common digitizing rate may be determined such that the receiver can process a superposed RF signal containing RF signals associated with two or more air interface standards.

In yet another particular case, the two or more RF signals comprise voice and data signals.

In accordance with another aspect of the present invention there is provided a wireless communication receiver for processing a superposed RF (radio frequency) signal containing two or more RF signals occupying overlapping RF bandwidth, in which the wireless communication receiver includes a wideband receiver for receiving the superposed RF signal, an analog to digital converter for converting the received superposed RF signal to a superposed digital signal using a previously determined common digitizing rate, a channelizer for at least a first RF signal having the smallest bandwidth of the RF signals that receives the superposed digital signal and limits the superposed digital signal to a bandwidth that corresponds with the bandwidth of the at least the first RF signal, providing at least one bandwidth clipped digital signal, a first signal handling device for the first RF signal that receives a first respective bandwidth clipped digital signal, and a signal handling device for each RF signal, other than the first RF signal, that receives one of the superposed digital signal and a respective bandwidth clipped digital signal. In particular, the first signal handling device includes a first decoder that removes interference and decodes the first respective bandwidth clipped digital signal to provide a first decoded signal representing the first RF signal and a rate converter that converts the sample rate for the decoded signal to a first standard DSP rate for the first RF signal while the signal handling device for each RF signal, other than the first RF signal, includes a multi-user detection decoder that receives the first decoded signal from the first decoder of the first signal handling device and shares data with multi-user detection decoders in any other signal handling devices to remove conventional and multi-access interference and decode the one of the superposed digital signal and respective bandwidth clipped digital signal to provide a decoded signal for each RF signal and a rate adjuster that adjusts the sampling rate of the decoded signal for each RF signal to a standard DSP rate for each RF signal.

In a particular case, each channelizer may include a rate reducer that reduces a sampling rate of the superposed digital signal to a reduced common digitizing rate which is a reduced multiple of the first standard DSP rate and a standard DSP rate for the each RF signal. In this case, the first signal handling device may include a stream separator for forming separate streams from the first bandwidth clipped digital signal, each stream based on a set of samples from the first bandwidth clipped digital signal at the first standard DSP rate, and wherein the decoder decodes the first bandwidth clipped digital signal using the streams.

In another particular case, the common digitizing rate may be determined such that the receiver can process a superposed RF signal containing RF signals associated with two or more air interface standards.

In yet another particular case, the two or more RF signals may include voice and data signals.

In accordance with another aspect of the present invention there is provided a wireless communication receiver for processing a superposed RF (radio frequency) signal containing two or more RF signals occupying overlapping RF bandwidth, in which the wireless communication receiver includes a sampling device for sampling the superposed RF signal at a first digitizing rate which is a multiple of a standard sampling rate for each RF signal, a stream separator that forms a number of streams from the sampled superposed RF signal, each stream based on a set of samples taken at the standard sampling rate for a first RF signal, a first decoder that decodes the streams to arrive at a digital estimate of the first RF signal and provides a final estimate of the first RF signal from the digital estimates, and a second decoder that decodes a second RF signal responsive to at least one of the digital estimates and the final estimate.

In a particular case, the first decoder may decode the first RF signal responsive to at least one of digital estimates and final estimates of at least one other of the two or more RF signals.

In another particular case, the wireless communication receiver may further include a channelizer, for at least the first RF signal, that receives the sampled superposed RF signal and limits the sampled superposed RF signal to a bandwidth that corresponds with a bandwidth of at least the first RF signal, providing at least one bandwidth clipped digital signal, and wherein the stream separator forms the number of streams from the bandwidth clipped digital signal.

In accordance with another aspect of the present invention there is provided a method for processing a superposed RF (radio frequency) signal containing two or more RF signals occupying overlapping RF bandwidth in a wireless communication receiver in which the method includes receiving the superposed RF signal, converting the received superposed RF signal to a superposed digital signal using a previously determined common digitizing rate, and for each of the RF signals, limiting the superposed digital signal to a bandwidth that corresponds with the bandwidth of the respective RF signal, providing a bandwidth clipped digital signal, using multi-user detection responsive to synchronized data received from other RF signals to decode the bandwidth clipped digital signal to remove conventional and multi-access interference and provide a decoded digital signal, and adjusting a sampling rate of the decoded digital signal to provide an output signal having a predetermined sampling rate.

In accordance with another aspect of the present invention there is provided a method of processing superposed RF (radio frequency) signals includes sampling the superposed RF signals at a first digitizing rate which is a multiple of a standard sampling rate for each RF signal of the superposed RF signals, for a first RF signal of the superposed RF signals, forming a number of streams from the sampled superposed RF signals, each stream based on a set of samples at the standard sampling rate for the first RF signal, decoding each of the streams to arrive at a digitized estimate of the first RF signal, deriving a final estimate from the digitized estimates, and decoding other RF signals of the superposed RF signals responsive to at least one the digitized estimate or the final estimate.

In a particular case, the method further includes, for each RF signal and prior to decoding of the RF signal, filtering the superposed RF signals to limit the superposed RF signals to a bandwidth occupied by the RF signal of the superposed RF signals.

In accordance with yet another aspect of the present invention there is provided a computer readable medium containing computer executable code for adapting a wireless communication receiver for processing a superposed RF (radio frequency) signal containing two or more RF signals occupying overlapping RF bandwidth to receive the superposed RF signal, convert the received superposed RF signal to a superposed digital signal using a previously determined common digitizing rate, and, for each of the RF signals limit the superposed digital signal to a bandwidth that corresponds with the bandwidth of the respective RF signal, providing a bandwidth clipped digital signal, use multi-user detection responsive to synchronized data received from other RF signals to decode the bandwidth clipped digital signal to remove conventional and multi-access interference and provide a decoded digital signal, and adjust a sampling rate of the decoded digital signal to provide an output signal having a predetermined sampling rate.

In accordance with still yet another aspect of the present invention there is provided a signal handling device for processing an RF (radio frequency) signal from a digital superposed RF signal, the digital superposed RF signal sampled at a first digitizing rate and having two or more RF signals occupying overlapping RF bandwidth, in which the signal handling device includes a decoder that decodes the digital superposed RF signal to arrive at a first estimate of the RF signal and receives first estimates of other RF signals from other signal handling devices and, responsive thereto, provides a second estimate of the RF signal, and a rate adjuster that adjusts a sampling rate of the second estimate from the first digitizing rate to provide an output signal having a second digitizing rate.

In a particular case, the first digitizing rate is a multiple of a standard sampling rate for each RF signal of the digital superposed RF signal and the signal handling device further includes a stream separator that forms a number of streams from the digital superposed RF signal, each stream includes a set of samples taken at the standard sampling rate for the RF signal and wherein the decoder decodes the streams to arrive at the first estimate of the RF signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

The invention makes use of the concept of a common digitizing (sampling) rate for an incoming RF signal as described in more detail in U.S. patent application Ser. No. 08/996,133 entitled "Common Digitizing Rate for Multiple Air Interfaces for Generic Cell Sites in Cellular Radio", filed by B. Lehman, B. Morris, G. Monette and B. Geddes on Dec. 22, 1997 (issued as U.S. Pat. No. 6,282,184), which is incorporated by reference herein. The common digitizing rate (common sampling rate) described in the Lehman '184 patent relates to a receiver for multiple air interfaces such as CDMA (J-STD-008 CDMA), TDMA (IS-136A TDMA) and GSM (J-STD-007A GSM) air interface standards, however, the approach can be extended to other air interface standards or situations using similar principles.

In the following description, the common digitizing rate used is based on a rate that is applicable to an overlapping signal including a signal conforming to the CDMA 1XRTT standard and a signal conforming to the UMTS UTRAN (ETSI-3GPP) standard. In particular, the embodiment described herein relates to an RF signal that includes overlapping voice (1XRTT) and data (UTRAN) components. The same principles will apply to overlapping voice and data components in other air interface standards. Further, although the services may be discussed in the context of (narrow-band) voice services and (wide-band) data services, it should be understood that voice could be equally carried on the wide-band channels and data on the narrow-band channels. The description of voice and data is used here for convenience.

Figure 1:
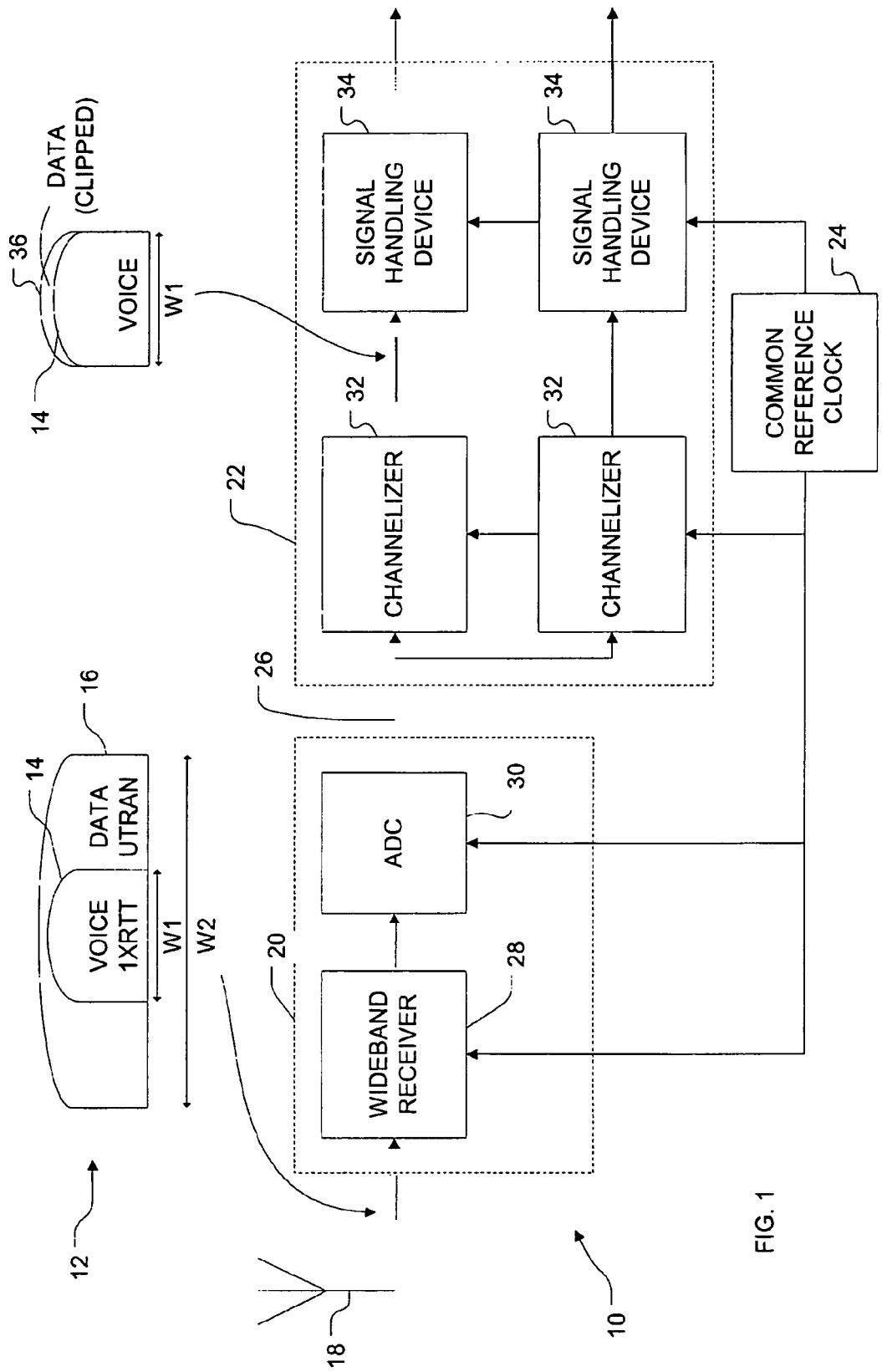
FIG. 1 is a schematic diagram of a receiver according to an embodiment of the invention.

FIG. 1 is a schematic diagram of a receiver 10 according to an embodiment of the invention. In this embodiment, we consider an RF signal 12 composed of a voice component 14 and a data component 16 that overlap within the same RF frequency band. As shown in FIG. 1, in this example, the RF signal 12 includes a voice component 14 of 1XRTT (Bandwidth W1=1.25 MHz) that is overlapping (or superposed on) a data component 16 of UTRAN (Bandwidth W2=5 MHz). In FIG. 1, the voice component 14 is shown centered in the data component 16, however, the voice component 14 (narrow-band signal) may be located anywhere in the data component 16 (wide-band signal).

The receiver includes an antenna 18, a front-end receive section 20, a back-end receive section 22, and a common reference clock 24. Preferably, the front-end receive section 20 is installed on or near the antenna 18 with a high speed optical link 26 connecting it to the back-end receive section 22 which would be typically installed on the ground near the base of the antenna tower (not shown). Of course, other methods of interconnection of the front-end receive section 20 and the back-end receive section 22 may also be used.

The RF signal 12 is first received by the antenna 18 and is then passed to the front-end receive section 20.

The front-end receive section includes a wideband receiver 28 and an analog-to-digital converter (ADC) 30. In the front-end receive section 20, the RF signal 12 is first processed by the wideband receiver 28. The wideband receiver 28 is set to have a bandwidth equal to the largest bandwidth to be processed, in this embodiment, W2=UTRAN. The RF signal 12 is first downconverted according to standard practices and then sent to the ADC 30.

The ADC 30 converts the RF signal 12 to a digital signal using a common digitizing rate is carefully chosen based on the technique described in the Lehman patent application and calculated as described below. The ADC 30 is driven at the common digitizing rate by a clock signal generated from the common reference clock 24.

The method used to select, generate and obtain the common digitizing rate is now summarized based on the approach in the Lehman patent application. The following description relates to a receiver supporting CDMA 1XRTT and UMTS UTRAN air interface standards, however, the approach can be extended to other air interface standards, including TDMA and GSM, using similar principles. The common digitizing rate is selected based on a 15 MHz bandwidth, that is, a bandwidth large enough to contain the contents of the signals employing any one of the CDMA 1XRTT and UMTS UTRAN air interface standards. In particular, the 15 MHz frequency bandwidth may be selected from the frequency spectrum allocated for US PCS (United States Personal Communication Service) operations, for example the band between 1850 MHz and 1865 MHz, and the band is then downconverted to, for example, the band between 3 MHz and 18 MHz. The band could also be selected from the frequency spectrum allocated for these standards in other regions of the world.

The common digitizing rate should be in conformance to the Nyquist theorem fundamental sampling rule: the minimum sampling rate must be 2*Fmax where here, Fmax=18 MHz is the upper frequency limit of the downconverted 15 MHz bandwidth signal. The common digitizing rate must therefore be at least 36 MHz and must be selected according to clock requirements specific to the CDMA and UTRAN air interface standards.

The following Table 1 lists the relevant air interface standards, corresponding DSP system rates in their standard form, and DSP system rates in their prime factor form.

TABLE 1

| Standard | System DSP rates (Hz) | Prime Factors |
|---|---|---|
| CDMA (1XRTT) 1.25 MHz channel bandwidth | chip rate (fc): 1228800 | $(2^{14}) * (3) * (5^2)$ |
| | DSP data rate: 9830400 | $(2^{17}) * (3) * (5^2)$ |
| TDMA - D-AMPS 30 KHz channel bandwidth | symbol rate: 24300 | $(2^2) * (3^5) * (5^2)$ |
| | DSP data rate: 48600 | $(2^3) * (3^5) * (5^2)$ |
| GSM 200 KHz channel bandwidth | symbol rate: 270833.3 | $(2^2) * (5^6)/3 * 13$ |
| | DSP data rate: 812500 | $(2^2) * (5^6) * 13$ |
| UTRAN 5 MHz channel bandwidth | chip rate ($fc_{(UTRAN)}$): 3840000 | $(2^{11}) * (3) * (5^4)$ |
| | DSP data rate: 7680000 | $(2^{12}) * (3) * (5^4)$ |

Whatever common digitizing rate is chosen, subsequent processing by respective CDMA, UTRAN, TDMA or GSM multichannel networks of a digital signal necessitates a sampling rate adjustment to bring the digital signal to the desired DSP rate for the respective standard. The complexity and cost of such sampling rate adjustment is proportional to the processing requirements of each rate conversion. In any combination of air interface standards, one of the standards will require the most processing to adjust the common digitizing rate to the desired DSP data rate. This higher processing demand can increase hardware complexity and cost. In order to reduce the overall hardware complexity and cost, it is preferable to select a common digitizing rate derived from a set of prime factors for the most processing intensive of the standards in adjusting from the common digitizing rate to the standard DSP data rate. This may preferably be carried out by initially choosing all of the prime factors of the most processing intensive air interface standard. If necessary, further prime factors may be successively chosen from other standards to ensure compliance with the Nyquist condition. However, the choice of such further prime factors should also be made after consideration of the processing cost.

In this example, the UTRAN standard requires the most complex processing among the particular combination of CDMA and UTRAN air interface standards for similar filtering requirements because its associated channel bandwidth is greater than that of the CDMA air interface standard. Accordingly, all of the prime factors for the UTRAN chip rate are chosen. The multiplication of the UTRAN prime factors $(2^{11})*(3)*(5^4)$ found in TABLE 1 above yields a basic digitizing rate of 3.84 MHz. However, this frequency is too low according to the Nyquist minimum sampling rate of 36 MHz calculated above. To satisfy the Nyquist condition, an additional factor is selected from the other standards. By inspection of the values contained in TABLE 1, the factor 8 is the most appropriate to choose from among the CDMA prime factors, as the sampling rate adjustment to be implemented in the UTRAN and CDMA signals is comparatively more cost-effective than the rate adjustment required if prime factors other than 8 are used. Therefore, the previously determined rate of 3.84 MHz is multiplied by a factor of 8 (from the CDMA prime factors) to produce a common digitizing rate of 30720000 Hz, which is also, according to the Nyquist criterion, too low. Thus, a further cost-effective factor of 2 may be chosen to yield a common digitizing rate of 61440000 Hz, which amply satisfies the Nyquist condition. The common digitizing rate is given in terms of its prime factors as $(2^{15})*(3)*(5^4)$ or can be expressed as a function of the CDMA chip rate, fc=1.2288 MHz, as follows:

Common digitizing rate=50*fc

Therefore, a receiver which simultaneously supports the UTRAN and CDMA air interface standards in accordance with this example may use an ADC with common digitizing rate of 50*1.2288 MHz=61.44 MHz. Other digitizing rates may alternatively be used to support other combinations of air interfaces. The rate of 52 fc, for example, is advantageous for systems combining CDMA and GSM.

As noted above, using the common digitizing rate of 50*fc requires some sampling rate adjustment for output at a standard DSP data rate based on the respective standards. The sampling rate adjustments to obtain the desired standard DSP data rate for a given air interface standard (see TABLE 1) are determined by dividing the common digitizing rate with respective CDMA, UTRAN, TDMA and GSM desired standard DSP data rates in their prime number form. Using CDMA as an example, the sampling rate adjustment to adjust from the common digitizing rate of 61.44 MHz to the CDMA standard DSP data rate of (8*fc) or (8*1.2288 MHz) is determined as follows:

$$\frac{\text{common digitizing rate } (50*fc):(2^{15})*(3)*(5^4)}{\text{CDMA DSP data rate } (8*fc):\ (2^{17})*(3)*(5^2)} =$$

CDMA sampling rate adjustment (dividend): 25/4

Thus, the CDMA sampling rate adjustment can be obtained by, for example, first decimating the incoming signal received at a rate of 50*fc by a factor of 25 and then interpolating it by a factor of 4. The UTRAN, TDMA and GSM sampling rate adjustments may be calculated in a similar way.

Returning to FIG. 1, after leaving the ADC, the digital signal is transmitted via the high-speed optical link 26 to the back-end receive section 22. The back-end receive section 22 is designed to tune and filter (to remove noise and Multiple Access Interference or "MAI" from) the digital signal and adjust its sample rate to the standard DSP data rate specified by the corresponding air interface standard.

In a back-end receive section 22 designed to handle multiple air interfaces there would generally be separate banks of channelizers and signal handling devices for each of the air interfaces and each bank of channelizers would include a number of channelizers for handling each of a number of channels within the RF signal 12 for a particular air interface. However, for ease of explanation, the back-end receive section 22 will be described only with regard to the CDMA and UTRAN air interface standards and will be restricted to channels having overlapping voice and data components, as shown in FIG. 1. Similar principles are applicable to other channels and to other air interface standards such as TDMA and GSM.

As shown in FIG. 1, the digital signal enters the back-end receive section 22 and is processed by a separate channelizer 32 and signal handling device 34 for each of the components or services to be received, in this case, voice and data.

When entering the back-end receive section 22, the digital signal can be expressed as $$R(t)=S_u(t)+S_1(t)+\text{cir}(t),$$

where $S_u(t)$ is the data signal with bandwidth W2, $S_1(t)$ is the voice signal with bandwidth W1, and cir(t) is the interference and noise signal.

Figure 2:
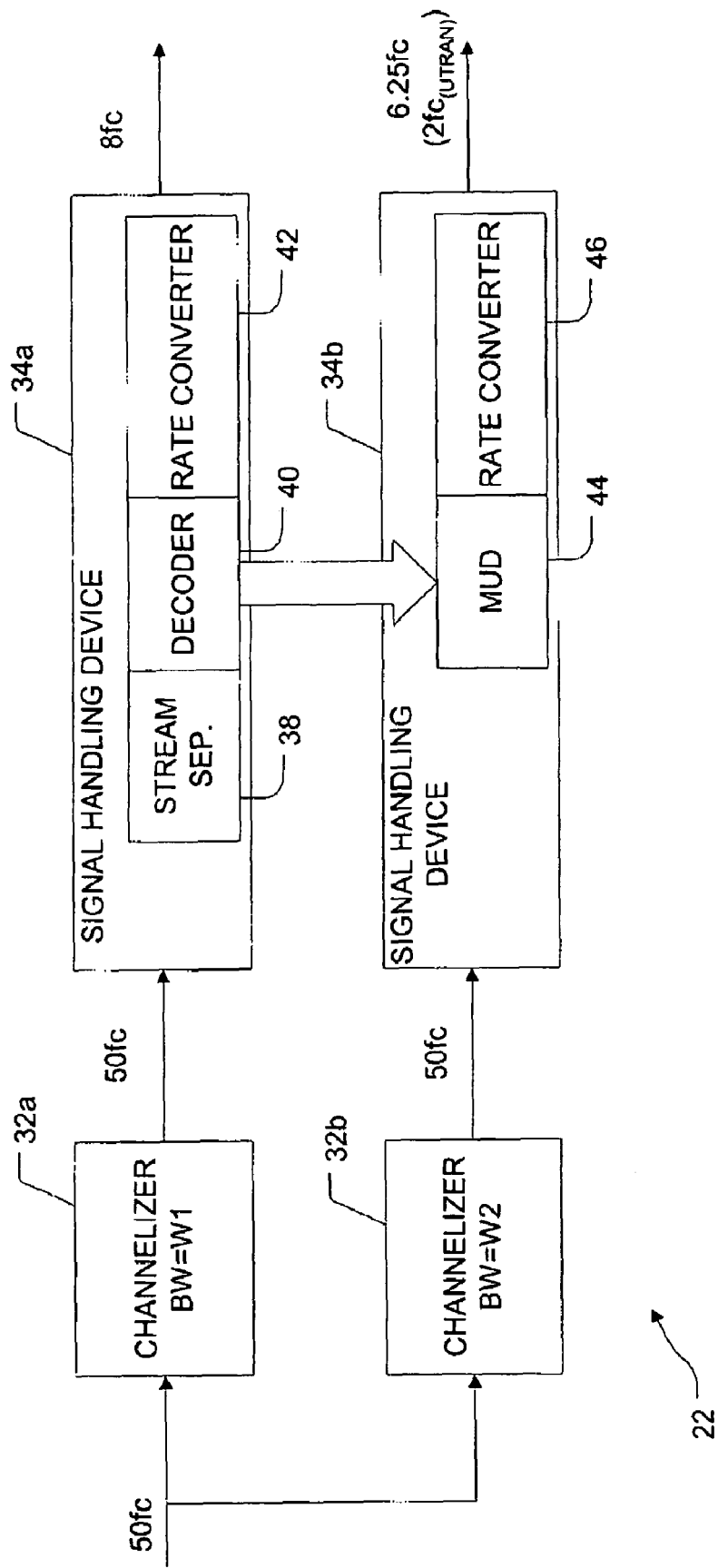
FIG. 2 is a schematic diagram of a back-end receive section of the receiver shown in FIG. 1.

FIG. 2 is a schematic diagram of the back-end receive section 22 of the receiver shown in FIG. 1. In this embodiment, two channelizers 32 and related signal handling devices 34 are provided. The first channelizer 32a has a bandwidth that represents the voice component (service) (W1=1XRTT) of the superposed signal and the second channelizer 32b has a bandwidth that represents the data component (service) (W2=UTRAN) of the superposed signal. In this case, since the RF signal 12 was already limited to the W2 bandwidth by the wide band receiver 28, the second channelizer may not be required, but its use is generally preferred to assure proper channel selectivity. In other embodiments, as indicated above, similar channelizers and signal handling devices might also be provided for other channels and/or sets of channelizers and signal handling devices might also be provided for other air interface standards.

We first examine the processing of the voice component. The digital signal is received at the first channelizer 32a and has the bandwidth clipped to provide a first bandwidth clipped signal 36 (see FIG. 1) of bandwidth W1. The first bandwidth clipped signal 36 is thus made up of the voice signal $S_1(t)$ and some noise caused by the overlap of the data signal $S_u(t)$. In particular, since the first channelizer 32a will cut off ¾ of the bandwidth of the data signal $S_u(t)$, only ¼ of the signal strength of $S_u(t)$ will be left as interference to the voice signal $S_1(t)$ and the noise due to the overlap will have the characteristics of Additive White Gaussian Noise (AWGN).

The first bandwidth clipped signal 36 is sent from the first channelizer 32a to the first signal handling device 34a. The first signal handling device 34a includes a stream separator 38, a decoder 40, and a rate converter 42.

The first bandwidth clipped signal 36 is based on a digitizing rate of 50 fc which represents a 6.25 times over-sampling as compared to the required output of 8 fc for the standard DSP data rate for the CDMA voice signal of the present example. The stream separator 38 creates a number of independent digital streams from the over-sampled data to achieve better accuracy. In this embodiment, the stream separator 38 is provided as a preferable component of the first signal handling device 34a but is not a required component.

The decoder 40 uses conventional iterative decoding techniques, such as single user detection or turbo decoding, to operate on each stream from the stream separator 38 independently and recover an approximation of the voice signal $S_1(t)$. Since the first bandwidth clipped signal 36 is oversampled and the noise portion has the characteristics of AWGN, the voice signal $S_1(t)$ can be accurately decoded using conventional techniques.

In the decoding process, the decoder 40 generally determines "soft bits" representing a probability that the voice signal $S_1(t)$ has a particular value and then uses an iterative process that fine tunes the probability and outputs "hard bits" representing the final output voice signal $S_1(t)$. As described in more detail below, in this embodiment, the decoder 40 feeds the soft bits to a multi-user detector (MUD) 44 included in a second signal handling device 34b.

The decoded voice signal $S_1(t)$ that is output by the decoder 40 is then converted to the standard CDMA DSP data rate of 8 fc by the rate converter 42 and is output from the receiver 10. As an alternative, the rate converter 42 might also be configured to convert the decoded voice signal $S_1(t)$ that is output by the decoder 40 to an alternate CDMA DSP data rate of 2 fc depending on the requirements of the system.

The digital signal from the ADC 30 is also fed to the second channelizer 32b and its bandwidth is clipped to provide a second bandwidth clipped signal of bandwidth W2. In this case, although preferred, it may not be necessary to provide the second channelizer 32b to clip the bandwidth since the wideband receiver 28 is already set to receive an RF signal 12 having bandwidth W2 as the maximum bandwidth to be received. Again, as indicated above, the use of channelizer 32b is preferred to ensure selectivity for the desired radio signal.

The second bandwidth clipped signal is then sent to the second signal handling device 34b. The second signal handling device 34b includes the multi-user detector (MUD) 44 and a rate converter 46. The MUD 44 receives the second bandwidth clipped signal and uses multi-user detection and iterative techniques such as turbo decoding to decode the data signal $S_u(t)$ from the second bandwidth clipped signal. Multi-user detection is a technique in which all signals in a superposed signal are detected jointly for more effective canceling of interference due to the multiple signals (i.e. Multiple Access Interference (MAI)). In this case, in addition to having an RF signal with a number of different overlapping users, the RF signal 12 also has a number of overlapping services such as voice and data.

In this embodiment, the multi-user detection is enhanced because the MUD 44 is provided with a sequence of soft bits fed from the first signal handling device 34a. These soft bits represent a good indication of the voice signal $S_1(t)$ for use in the MUD 44 rather than having the MUD 44 detect the voice signal $S_1(t)$ separately. Further, since the first and second bandwidth clipped signals fed to the first and second signal handling devices 34a, 34b share a common digitizing rate, the soft bits are available at the same rate as the second bandwidth clipped signal arriving at the MUD 44. Similar to the decoder 40 described above, the MUD 44 generally determines "soft bits" representing the probability that the data component of the second bandwidth clipped signal has a particular value and then uses an iterative process that fine tunes the probability and outputs "hard bits" representing the final output signal. Thus, the MUD 44 recovers the data signal $S_u(t)$ which is then converted to the standard UTRAN DSP data rate of twice the UTRAN chip rate, $2\ fc_{(UTRAN)}$ (i.e., 6.25 fc) by the rate converter.

As an example of the use of soft bits in the MUD 44, the soft bits received from the first signal handling device 34a may be in log likelihood ratio (LLR) format, defined by $$llr_1(k) = \log p(S_1(k)=1)/p(S_1(k)=0),$$

where $p(S_1(k)=1)$ is the probability that $S_1(k)$ is 1 and $p(S_1(k)=0)$ is the probability that $S_1(k)$ is 0. The bit probability of $S_u(k)$ can then be calculated in the MUD 44 using $$p(S_u(k)=1|R(k))=p(S_1(k)=1)p(R(k)|S_1(k)=1,S_u(k)=1)+p(S_1(k)=0)p(R(k)|S_1(k)=0,S_u(k)=1)$$

$$p(S_u(k)=0|R(k))=p(S_1(k)=1)p(R(k)|S_1(k)=1,S_u(k)=0)+p(S_1(k)=0)p(R(k)|S_1(k)=0,S_u(k)=0),$$

where $R(k)$ is the digital signal received, $p(S_u(k)=1|R(k))$ is the probability that $S_u(k)=1$ for a given $R(k)$ and $p(R(k)|S_1(k)=1,S_u(k)=1)$ is the estimated probability that the known $R(k)$ will occur if $S_1(k)=1$, $S_u(k)=1$, and other terms have similar meanings. As an example, the estimated probability $p(R(k)|S_1(k)=1,S_u(k)=1)$ can be modeled with a Gaussian distribution.

These calculations give a soft bit for the second bandwidth clipped signal in LLR format as $$llr_u(k) = \log p(S_u(k)=1)/p(S_u(k)=0),$$

which can be used for further iterative processes in the MUD 44 prior to outputting the data signal $S_u(k)$ for rate conversion as indicated above.

Alternatively, the decoder 40 may send hard bits of the voice signal $S_1(k)$ to the MUD 44 for use in decoding the data signal $S_u(k)$. In this case the terms $p(S_1(k)=1)$ and $p(S_1(k)=0)$ in the two equations above will be replaced by respective hard bits.

Figure 3:
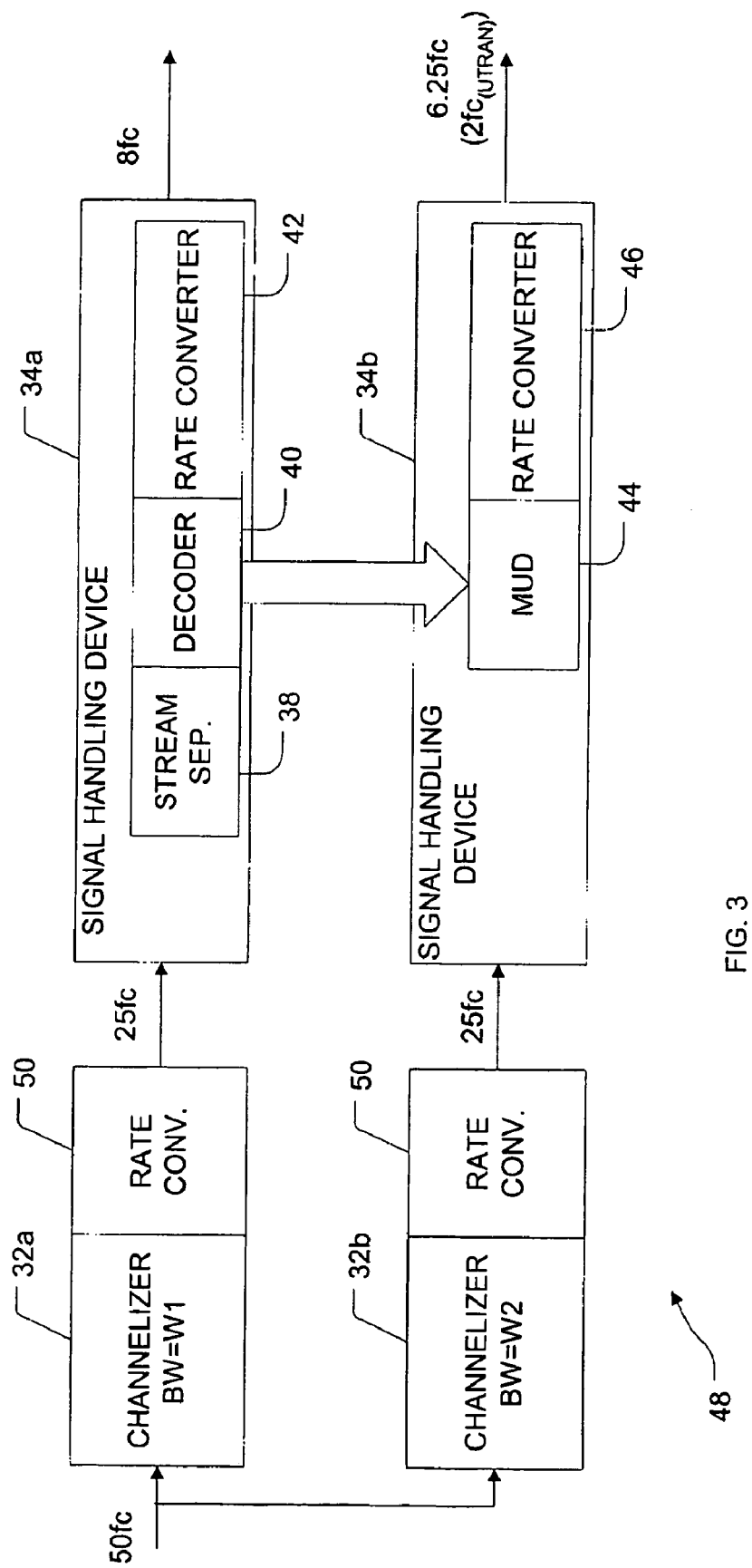
FIG. 3 is a schematic diagram of an alternate back-end receive section of the receiver shown in FIG. 1.

FIG. 3 is a schematic diagram of an alternate back-end receive section 48 according to another embodiment of the invention. The elements of the back-end receive section 48 are similar to those described above, except that each of the channelizers 32 are provided with rate converters 50 that adjust the sampling rate from 50 fc to a reduced multiple of the required rates for the voice and data signals. In the case of a voice signal at 1XRTT (8 fc) and a data signal at UTRAN (2 $fc_{(UTRAN)}$, i.e. 6.25 fc), the reduced multiple rate may be 25 fc (i.e. 8 times the chip rate for UTRAN) or other rate as may be convenient for rate adjustment. By adjusting the sampling rate downward at the channelizers 32, the computational requirements at the signal handling devices 34 can be reduced. The reduced multiple rate is a common rate so that the signals entering the signal handling devices 34 remain synchronized at this new common digitizing rate. The use of a reduced multiple rate also ensures that the lower bandwidth signal (in this case, 1XRTT) will still be oversampled to some extent, in this case 25 times the chip rate of the 1XRTT, to provide more accurate decoding of the lower bandwidth signal. Similar to as above, the rate converter 42 in the first signal handling device 34a later adjusts the sampling rate for the voice signal $S_1(k)$ from the reduced multiple rate to the CDMA standard DSP data rate for output and, the rate converter 46 in the second signal handling device 34b adjusts the sampling rate for the data signal $S_u(k)$ from the reduced multiple rate to the UTRAN standard DSP data rate for output.

As another example, a similar arrangement may be used in the case of a receiver configured to handle overlaid signals of a voice channel of 1XRTT (with, for example, a standard DSP rate of 8 fc or as low as 2 fc) and a data channel of 3XRTT (with, for example, a standard DSP rate of 6 fc). In this case, the rate converters 50 at the channelizers 32 may be configured such that the sampling rate is converted to 6 fc as a reduced multiple rate for the two standard DSP rates 2 fc and 6 fc. The rate converters 42, 46 in the signal handling devices 34 may then convert from the reduced multiple rate 6 fc to the standard DSP data rates of 2 fc for voice and 6 fc for data. However, in this example, since no further sampling rate adjustment is required for the data signal $S_u(k)$, the rate converter 46 in the second signal handling device 34b may not be required.

Figure 4:
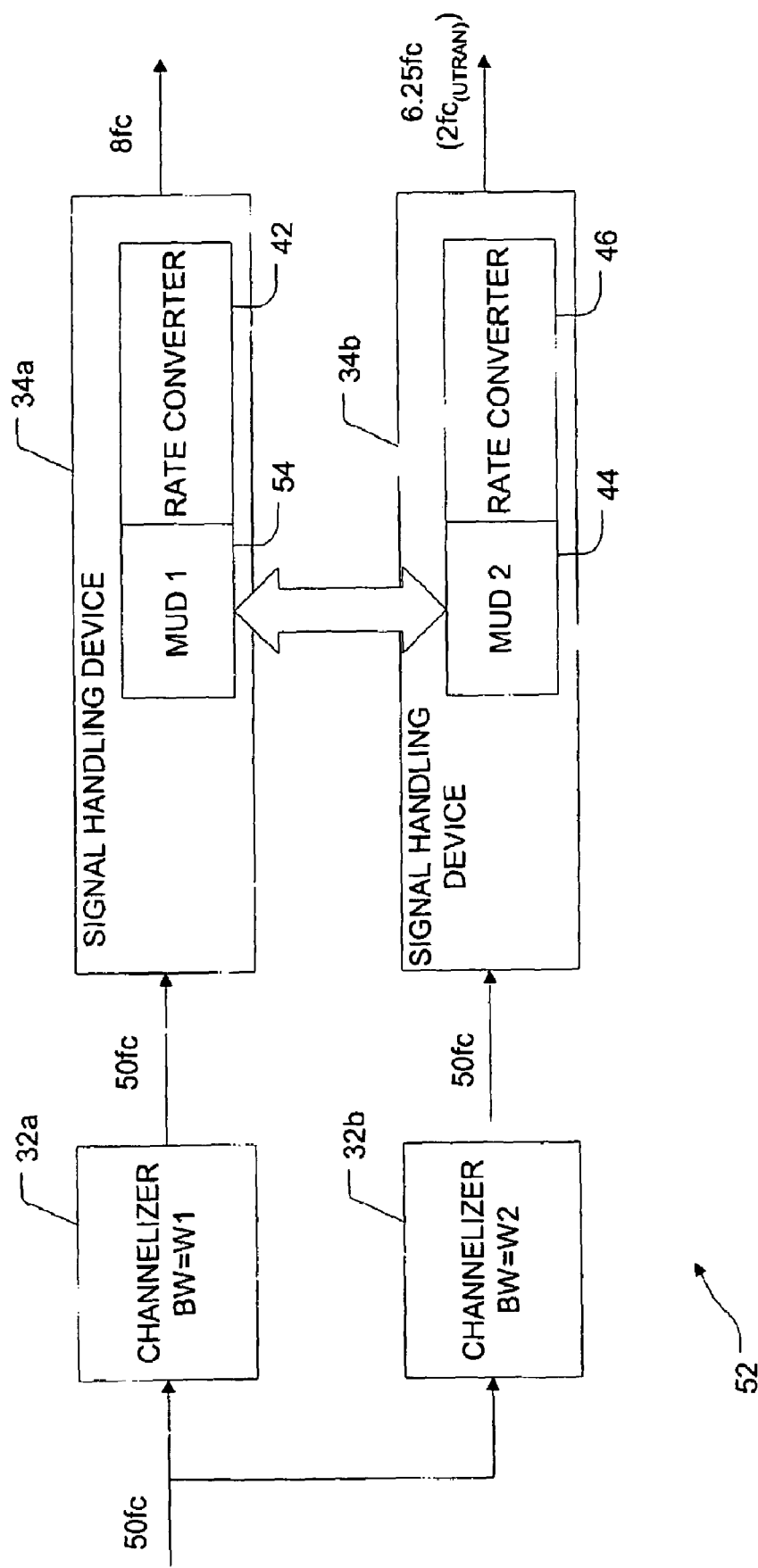
FIG. 4 is a schematic diagram of another alternate back-end receive section of the receiver shown in FIG. 1.

FIG. 4 is a schematic diagram of an alternate back-end receive section 52 according to another embodiment of the invention. This alternative is similar to the back-end receive section 22 shown in FIG. 2, however, rather than having one way communication of soft bits between the decoder 40 and MUD 44 as in FIG. 2, the decoder 40 in the first signal handling device 34a is replaced with a MUD 54 and two way communication between the two MUDs 44, 54 is established. In this embodiment, the MUDs 44, 54 in each of the signal handling devices 34 communicate with each other providing an exchange of soft bits or hard bits that are used in multi-user detection interference canceling techniques for both the voice and data signals. Thus, the MUD 44 for the voice signal $S_1(k)$ will also receive soft bits from the MUD 54 for the data signal $S_u(k)$ to be used in canceling interference due to the data signal $S_u(k)$. This arrangement is preferable when there are a larger number of overlapped signals or the size of the bandwidths of the overlapped signals are closer together. The use of MUDs 44, 54 in each signal handling device 34 will allow more accurate identification of the overlapped signals. In this embodiment, the stream separator 38 of FIG. 2 has been removed, however, optionally, it may be included in at least the signal handling device 34a for the lower bandwidth signal. As described above with regard to FIG. 3, the channelizers 32a, 32b may similarly be provided with rate converters 50 in this embodiment.

Figure 5:
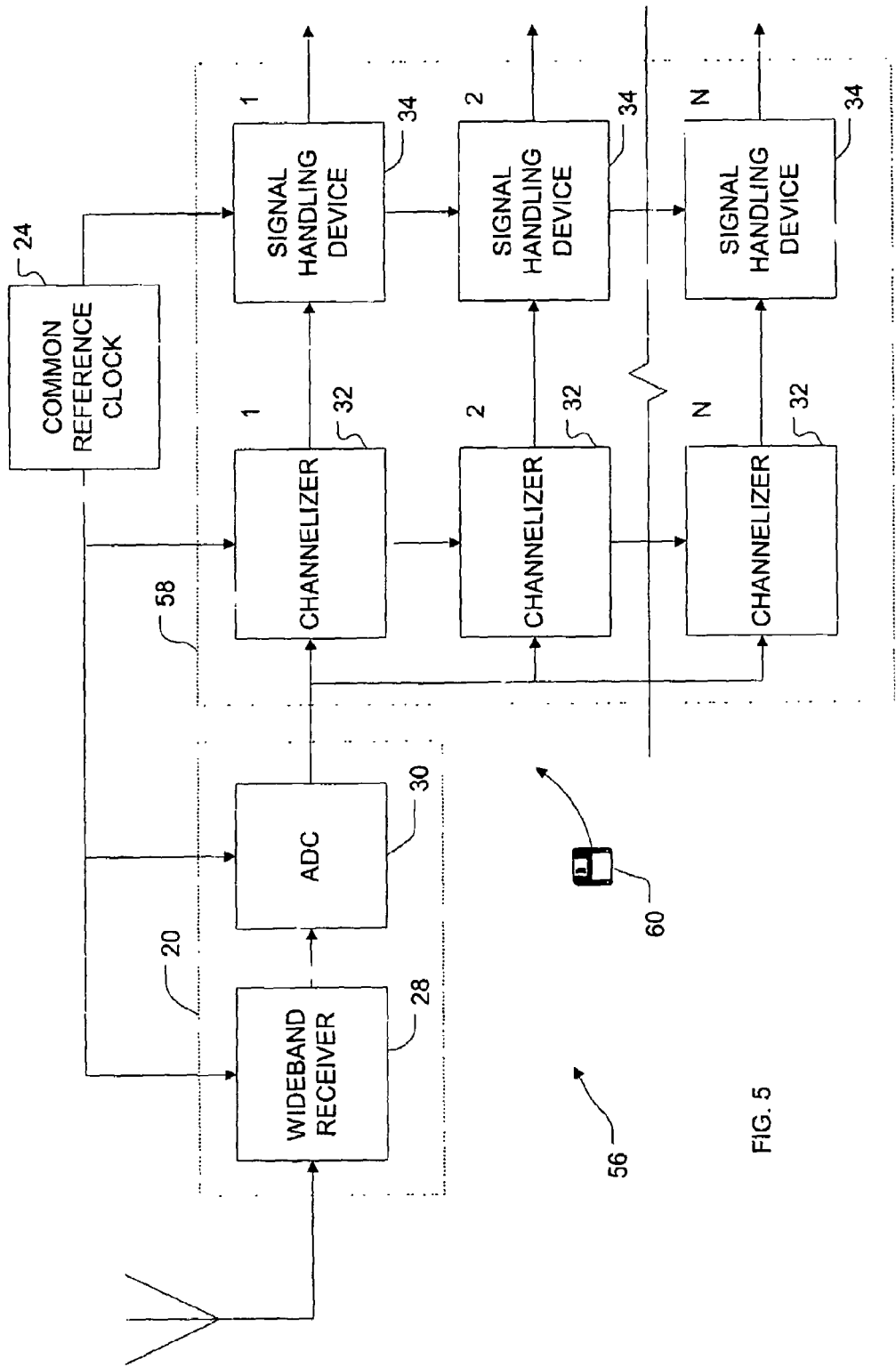
FIG. 5 is a schematic diagram of an alternate receiver according to an embodiment of the invention.
Figure 6:
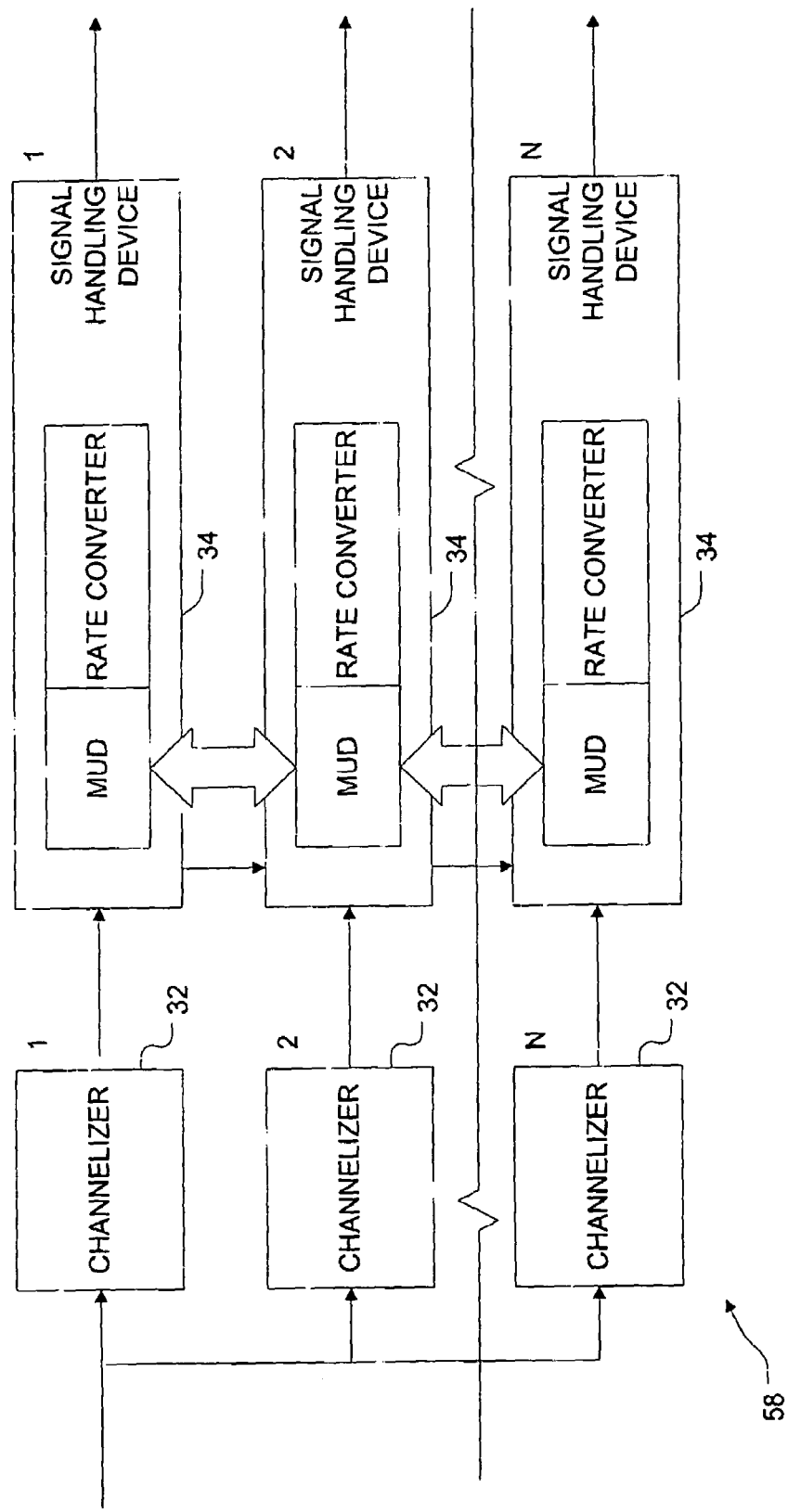
FIG. 6 is a schematic diagram of a back-end receive section of the receiver shown in FIG. 5.

As will be apparent to a person skilled in the art, the principles described above can be extended to a number of signals or services that overlap in bandwidth. For example, as shown in FIG. 5, a receiver 56 may include a back-end receive section 58 containing any reasonable number of channelizers 32 and signal handling devices 34 (from 1 to N), each operating on a particular signal or service and using multi-user detection techniques to extract the relevant signals from the wide bandwidth RF signal. As indicated above, this basic structure can also be extended to multiple air interface standards and to multiple channels within each air interface standard. FIG. 6 illustrates one possible configuration for the back-end receive section 58 and the signal handling devices 34 of FIG. 5. As indicated above, optionally, a stream separator may be provided to each signal handling device except perhaps the signal handling device acting on the largest bandwidth signal.

Further, as will also be apparent to a person skilled in the art, various aspects of the invention may be implemented in software or hardware in a specific or general-purpose computer (not shown). In a particular example, as shown in FIG. 5, the back-end receive section 58 may be adapted to execute computer executable code stored in a computer memory (not shown) or stored on a computer disk 60 or on other computer media such as a hard disk (not shown) or as is known in the art to perform the method or aspects thereof according to an embodiment of the invention.

Still further, in an alternative, although not preferred, arrangement, the channelizers 32 may be replaced with analog channelizers or filters (not shown) provided between the wideband receiver 28 and the ADC 30.

As indicated above, optionally, where the bandwidth of the wideband receiver approximates the bandwidth of the largest bandwidth RF signal, the channelizer for the largest bandwidth RF signal may be omitted. Further, in some instances, the receiver may function even without channelizers, although the noise that would need to be filtered from some of the RF signals by the decoders would then be greatly increased. Thus, a channelizer is normally required for at least the smallest bandwidth RF signals.

In the above embodiments, the techniques of using a wideband receiver, a wideband digital IF (channelizer) tuner, a common digitizing rate (which may, in some cases, be the least common multiple), and multi-user detection for interference/signal canceling are combined to provide an apparatus and method for processing a superposed RF (radio frequency) signal containing two or more RF signals occupying overlapping RF bandwidth.

The use of a wideband receiver allows signals of different bandwidths to share the analog part of the receiver. The channelizers limit the bandwidth to focus on each particular signal and can also be used to adjust the sampling rate. Mutual interference in the output of each channelizer is suppressed through multi-user detection techniques in the baseband processing. The common digitizing rate assists in the interference suppression or cancellation by providing oversampling of at least the lower bandwidth signal and by providing synchronized soft (or hard) bits from other signals to be used in the multi-user detection. These techniques may also exploit, in particular, the virtual array structure of a CDMA signal and the deterministic characteristics of the voice data.

The receiver according to an embodiment of the invention provides for combination of voice and data services overlapping in the same spectrum band and using a common receiver structure for both services. This allows dynamic optimization of use of spectrum and higher overall capacity. In particular, a communication system utilizing an embodiment of the invention would allow an operator to transition to new services without the need to purchase new equipment for their radio base stations and users to make use of new services without the need to purchase new handsets.

Other modifications will be apparent to those skilled in the art and, therefore, the invention is defined in the claims.

We claim:

1. A wireless communication receiver for processing a superposed RF (radio frequency) signal containing two or more RF signals occupying overlapping RF bandwidth, the wireless communication receiver comprising:
    a wideband receiver for receiving said superposed RF signal;
    an analog to digital converter for converting said received superposed RF signal to a superposed digital signal using a common digitizing rate;
    a channelizer for each of said RF signals that receives said superposed digital signal and limits said superposed digital signal to a bandwidth that corresponds with the bandwidth of each of said RF signals, providing a bandwidth clipped digital signal for each of said RF signals; and
    a signal handling device for each of said RF signals that receives one said bandwidth clipped digital signal, said signal handling device comprising:
        a multi-user detection decoder that shares data with multi-user detection decoders in other ones of said signal handling device to decode said bandwidth clipped digital signal to remove conventional and multi-access interference and provide a decoded digital signal; and
        a rate adjuster that adjusts a sampling rate of said decoded digital signal to provide an output signal having a predetermined sampling rate.

2. The wireless communication receiver of claim 1, wherein each said channelizer includes a rate adjuster that adjusts a sampling rate of said superposed digital signal to an adjusted common digitizing rate, wherein said adjusted common digitizing rate is a reduced multiple of each said predetermined sampling rate.

3. The wireless communication receiver of claim 1 wherein at least one signal handling device includes a stream separator for forming separate streams from said bandwidth clipped digital signal, each stream based on a set of samples from said bandwidth clipped digital signal at said predetermined sampling rate and wherein said multi-user detection decoder decodes said bandwidth clipped digital signal responsive to said streams.

4. The wireless communication receiver of claim 3, wherein all but said signal handling device for said RF signal having the largest bandwidth is provided with said stream separator.

5. The wireless communication receiver of claim 1, wherein said common digitizing rate is determined such that said receiver can process a superposed RF signal containing RF signals associated with two or more air interface standards.

6. The wireless communication receiver of claim 1, wherein said two or more RF signals comprise voice and data signals.

7. A wireless communication receiver for processing a superposed RF (radio frequency) signal containing two or more RF signals occupying overlapping RF bandwidth, the wireless communication receiver comprising:
    a wideband receiver for receiving said superposed RF signal;
    an analog to digital converter for converting said received superposed RF signal to a superposed digital signal using a previously determined common digitizing rate;
    a channelizer for at least a first RF signal having the smallest bandwidth of said RF signals that receives said superposed digital signal and limits said superposed digital signal to a bandwidth that corresponds with the bandwidth of each of said at least said first RF signal of said RF signals, providing at least one bandwidth clipped digital signal;
    a first signal handling device for said first RF signal that receives a first respective bandwidth clipped digital signal, comprising:
    a first decoder that removes interference and decodes said first respective bandwidth clipped digital signal to provide a first decoded signal representing said first RF signal; and a rate converter that converts the sample rate of said first decoded signal to a first standard DSP rate for the said first RF signal; and a signal handling device for said each RF signal, other than said first RF signal, that receives one of said superposed digital signal and respective said at least one bandwidth clipped digital signal, comprising:

a multi-user detection decoder that receives said first decoded signal from said first decoder of said first signal handling device and shares data with multi-user detection decoders in any other signal handling devices to remove conventional and multi-access interference and decode said one of said superposed digital signal and respective said at least one bandwidth clipped digital signal to provide a decoded signal for said each RF signal; and a rate adjuster that adjusts the sampling rate of said decoded signal for said each RF signal to a standard DSP rate for said each RF signal.

8. The wireless communication receiver of claim 7, wherein each said channelizer includes a rate reducer that reduces a sampling rate of said superposed digital signal to a reduced common digitizing rate which is a reduced multiple of said first standard DSP rate and a standard DSP rate for said each RF signal.

9. The wireless communication receiver of claim 8, wherein said first signal handling device includes a stream separator for forming separate streams from said first bandwidth clipped digital signal, each stream based on a set of samples from said first bandwidth clipped digital signal at said first standard DSP rate, and wherein said decoder decodes said first bandwidth clipped digital signal using said streams.

10. The wireless communication receiver of claim 7, wherein said common digitizing rate is determined such that said receiver can process a superposed RF signal containing RF signals associated with two or more air interface standards.

11. The wireless communication receiver of claim 7, wherein said two or more RF signals comprise voice and data signals.

* * * * *